United States Patent [19]

Evanyk et al.

[11] Patent Number: 4,829,560
[45] Date of Patent: May 9, 1989

[54] COMMUNICATIONS SYSTEM FOR USE IN A HOTEL/MOTEL

[75] Inventors: Walter R. Evanyk, Plano; Michael H. Beber, Allen; Joel R. Donaldson, Laredo; J.Orville Larsen; David G. Adams, both of Plano; Michael W. Douglas, Garland, all of Tex.

[73] Assignee: Spectradyne, Richardson, Tex.

[21] Appl. No.: 9,187

[22] Filed: Jan. 30, 1987

[51] Int. Cl.⁴ .................. H04M 11/00; H04J 3/14; H04Q 9/02
[52] U.S. Cl. .................. 379/106; 340/825.04; 340/870.03; 370/17
[58] Field of Search .............. 379/102, 104, 105, 106, 379/107; 358/86; 455/4, 5; 340/825.08, 825.16, 870.03; 330/17

[56] References Cited

U.S. PATENT DOCUMENTS

| | | | |
|---|---|---|---|
| 3,737,858 | 6/1973 | Turner et al. ............... | 340/870.03 |
| 4,008,369 | 2/1977 | Thuerer et al. ............. | 358/86 X |
| 4,057,829 | 12/1977 | Moorehead ............... | 358/86 |
| 4,213,182 | 7/1980 | Eichelberger et al. ....... | 379/102 X |
| 4,360,828 | 11/1982 | Briggs, Jr. et al. .......... | 358/86 |
| 4,365,249 | 12/1982 | Tabata et al. ............. | 358/86 X |
| 4,408,345 | 10/1983 | Yashiro et al. ............ | 358/86 X |
| 4,439,784 | 3/1984 | Furukawa et al. .......... | 358/86 |
| 4,484,218 | 11/1984 | Boland et al. ............. | 358/86 |
| 4,598,286 | 7/1986 | Miller et al. .............. | 379/105 X |
| 4,648,123 | 3/1987 | Schrock ................... | 455/5 X |
| 4,665,544 | 5/1987 | Honda et al. ............. | 379/104 |
| 4,700,222 | 10/1987 | Large et al. .............. | 358/86 |

Primary Examiner—Keith E. George
Attorney, Agent, or Firm—Sigalos, Levine & Montgomery

[57] ABSTRACT

A communications system for use in a coaxial cable data transmission system such as in a hotel/motel system between a central processor and a room and the room and appliances within the room wherein frequency shift key modulation of a high frequency signal is used for communication between the central processor and the rooms and amplitude shift key modulation of a low frequency signal is utilized for communication within the room between the in-room controller and appliances within the room. In addition, the system also utilizes a serial interface input/output card in the central processor which detects the quality of the signal coming from each room in regard to frequency, signal level and deviation and stores those signals for maintenance purposes. Also, the system provides for long distance interrogation of the central processor over telephone lines so that the hotel/motel operating system may be reviewed from a remote distance.

28 Claims, 3 Drawing Sheets

COMMUNICATIONS SYSTEM FOR USE IN A HOTEL/MOTEL

BACKGROUND OF THE INVENTION

The present invention relates to a communication system for use in a coaxial cable data transmission system such as in a hotel/motel between a central processor and a remote terminal located in each of a plurality of customer rooms. Specifically, the system has an in-room polling link with request to speak to the head end. It also includes an in-line monitoring device located in the central processor and inserted in the communication line between the central processor and the remote terminals in remote locations such as in a plurality of hotel/motel rooms. The monitoring device measures selected signal parameter data representing the quality of each of the signals transmitted by the remote terminal, which may be an in-room controller, to the head end. Further, the system includes a control center remote from the central processor and coupled to a telephone modem external of the central processor for generating interrogation signals to the central processor to access stored data representing each of the transmitted remote location signals so that the remote controller signals may be reviewed remotely for content and quality to assist maintenance purposes. While the present system is useful for any coaxial cable data transmission system, it will be discussed in relation to a hotel/motel system for ease of explanation.

There are many different systems for communicating between rooms of a hotel/motel and a centrally located processor for transmitting to and receiving signals from a hotel/motel room to govern transmission of TV programs, display of messages on the room television and reception of data from the rooms representing conditions of various room appliances such as a safe, refrigerator, and the like.

Bi-lateral signaling systems, used in hotel/motel and/or apartment complexes or the like, communicate television signals from a head end to a plurality of rooms having TV apparatus therein and permit a bi-lateral data exchange between the head-end and each room apparatus. The head-end and the rooms are connected via a common coaxial cable which may typically be the master antenna television video (MATV) signal distribution cable in such hotel or analogous environment to distribute video programming from a master antenna and/or other head-end video source. In addition, it is common to supplement the available video signals with premium programs for which a fee is charged. Such programs may comprise recently released films, sporting events not available on commercial television, or the like. Such premium programs are transmitted in the form of a frequency spectrum which cannot be received by a standard television set.

To permit reception of such premium television signals, each room is provided with a video frequency converter which converts the frequency spectrum of a selected premium video signal to the VHF frequency band of a standard channel thus rendering the premium signal receivable by the standard television set located in the room.

In addition, the head-end may be employed to send data messages to the room apparatus to control various power loads in the room for energy conservation purposes such as issuing data messages to turn electrical loads on or off including air-conditioning, heater and the like. Further, such systems are used to monitor and/or control access, indicate maid status, detecting presence of equipment, and the like, thus keeping track of events occurring in a particular room.

Several problems are associated with such prior art systems. Many such problems occur because each of the appliances to be monitored in a room must be monitored sequentially by the head-end central processor in order to check all room appliances. It can be seen that with a large number of rooms, i.e. 1,000 or more, even with very fast computers, the computer may be delayed with this sequential monitoring in detecting an important event occurring in a room.

A second problem relates to the quality of the signal being transmitted from each room. Signal quality as used herein is defined as signal level, signal frequency and signal frequency deviation. Because the electronic devices such as amplifiers which are contained in each room may fail from time to time, the signal level, frequency, or deviation may vary to such extent that the data being received is inaccurate or entirely missing. The prior art solves this problem by placing a plurality of line monitoring devices at various positions along the system. Thus one monitor may be coupled to several rooms and can generate an alarm if one of the signals from a room to which a particular monitor is connected deviates from prescribed norms. However, each of these monitoring units is identified by a unique address. Thus to determine conditions throughout the system, a central monitoring system transmits polling signals on the cables with particular addresses contained within the signals. If a particular address matches with a pre-stored identifying address in a monitoring terminal, the monitor responds by transmitting data produced by the monitoring units back to the central facility.

Finally, technicians must be kept at each central facility to detect any warning signals that are generated which indicate that problems exist on the line. They can then examine the lines and determine the equipment which is malfunctioning and replace it.

The present system overcomes these disadvantages by providing an appliance interface controller (AIC) coupled to each appliance to be monitored in a particular room which can detect signals from sensors on the appliance and store those signals representing the condition of the appliance in its memory. In addition, a remote terminal such as an in-room controller (IRC) is coupled to each of the appliance interface controllers and polls them on a periodic basis to determine the status of the appliances. Should a change in the appliance condition occur, the AIC will notify the in-room controller which will either request communication with the central processor or wait until the central processor polls that particular room. The IRC then provides a response signal to the central processor where it is stored.

Secondly, the present invention utilizes a signal monitoring unit formed as part of the central processor which intercepts all signals from all in-room controllers communicating with the central processor and monitors the signal level, the frequency and the frequency deviation. The output of the in-line monitor is then converted to a digital signal and stored in the central processor memory to produce warning signals so that technicians can identify the room and correct the problems that occur with the signals from that room.

Thirdly, the present invention utilizes a telephone modem coupled to the computer in the central processor to request access to the memory banks so that from long distances, the condition of the communication system with the various rooms can be examined and, if problems are indicated, a technician can be called to search out and correct the problem. Thus one individual can monitor a large number of different site locations by telephone from a remote distance eliminating the need for constant supervision by personnel at the site where the central processors are located. In addition, any other data stored in the hotel central processor could be accessed for statistical purposes such as marketing. For instance, it may be important to know what TV channels were activated or what pay movies were viewed in the room.

Thus it is an object of the present invention to provide a single line monitoring device for a communications system between a central processor and a plurality of remote terminals wherein the line monitoring device is located in the central processor to measure selected parameter data representing the quality of each transmission signal received from each remote terminal by the central processor and store such data in the central processor memory.

It is a further object of the present invention to enable telephone communications with the central processor from a control center remote from the central processor and coupled to the central processor through a telephone modem. The remote control center utilizes telephone lines for generating interrogation signals to a computer in the central processor to access the computer storage and recover data representing content such as statistical data for various purposes or the quality of the transmitted signals from remote terminals, such as the in-room controller, so that the data content and quality of each of the response signals from the remote terminals may be reviewed remotely for maintenance purposes.

It is also an object of the present invention to provide a communication system for use in a hotel/motel wherein each room has an appliance interface controller coupled to each appliance, and an in-room controller coupled to each appliance interface controller for periodically polling each of the appliance interface controllers to determine the condition of a particular appliance. The in-room controller can then transmit the condition of any appliance to a central processor.

SUMMARY OF THE INVENTION

Thus the present invention relates to a communications system for use in a coaxial cable data transmission system between a central processor and a remote terminal located in each of a plurality of remote locations comprising means in each of said remote terminals for generating an identifiable data transmission signal, means in a central processor coupled to each of said remote terminals by a communication line for receiving and storing said identifiable data transmission signal content, a line monitoring device in said central processor coupled to said communication line for measuring selected parameter data representing the quality of each of said identifiable data transmission signals, and storage means in said central processor coupled to said monitoring device for recoverably storing each of said selected measured signal parameters so that the stored data representing the content and quality of each transmitted identifiable data signal may be accessed.

The invention also relates to a communications system for use in a coaxial cable data transmission system between a central processor and a remote terminal located in each of a plurality of locations comprising means in each of said remote terminals for generating an identifiable data transmission signal, means in said central processor for storing the content and quality of said identifiable data transmission signal, an interface in said central processor, a telephone modem external of said central processor and coupled to said interface for enabling telephone communications with said central processor, and a control center remote from said central processor and coupled to said modem by telephone lines for generating interrogation signals to said central processor to access said storage means in said central processor and recover said stored data representing the content and quality of each said transmitted signal from each remote terminal so that the content and quality of each of the selected signals may be reviewed remotely.

The invention further relates to a communications system between remote terminals and a central processor including means in each of the remote terminals for generating an identifiable data transmission signal representing an appliance condition, a remote controller, a plurality of appliances in each remote location, at least one sensor in each appliance for generating an identifiable data signal representing a condition of said appliance, and an appliance interface controller coupled to each appliance for receiving said condition representing signal, means in said appliance interface controller for transmission of a signal representing said condition to said remote controller, signal means in said remote controller for intermittently polling each appliance interface controller and receiving and recovering said condition representing signal in response to said polling signal and means in said remote controller for modulating a high frequency signal with said recovered condition representing signal and a coded signal identifying said remote location for transmission to said central processor.

BRIEF DESCRIPTION OF THE DRAWINGS

These and other objects of the present invention will be disclosed more fully in conjunction with accompanying drawings in which like numerals represent like components and in which.

DETAILED DESCRIPTION OF THE DRAWINGS

Figure 1:
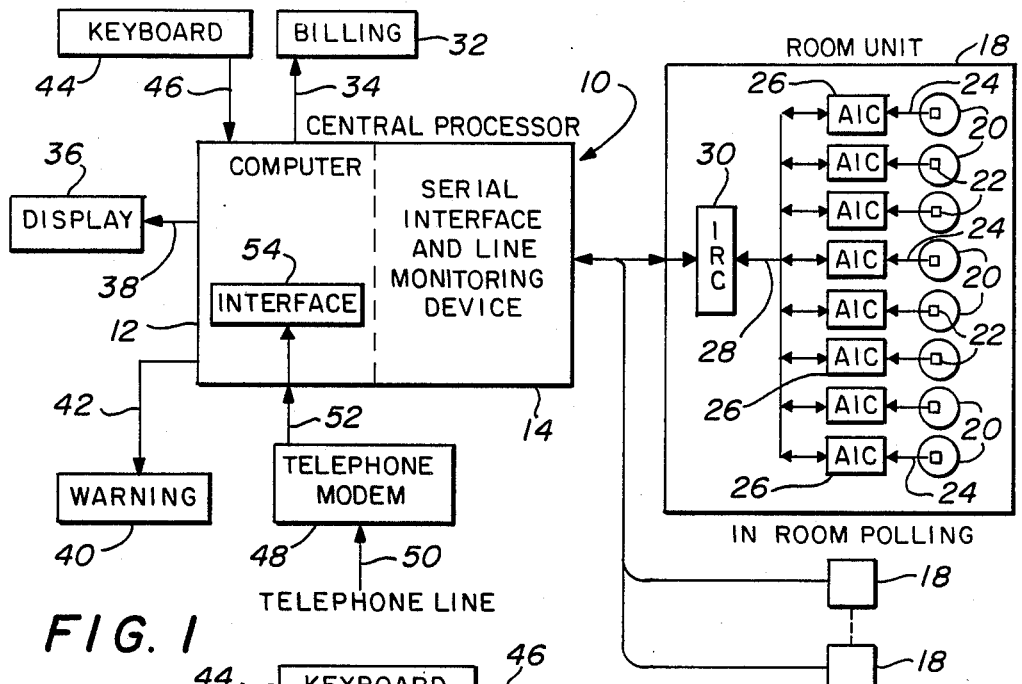
FIG. 1 is a schematic view of the invention illustrating the room unit with the in-room controller and the appliance interface controller, the serial interface line monitoring device and the telephone modem for remote communication by telephone with the central processor.

FIG. 1 is a schematic view of the entire system including the central processor 10 which is comprised of a computer 12 and serial interface line monitoring device 14 coupled through a communication line 16 to a plurality of room units 18. Each room unit 18 includes a plurality of appliances 20 each of which has at least one sensor 22 associated therewith for generating an identifiable data signal representing a condition of an appliance. For instance, the appliances may include air-conditioner, heaters, refrigerators, safes, doors, and the like. The associated sensors may generate an identifiable data signal representing a heater turned on, air-conditioning turned on, products removed from refrigerator, a safe door opened, room door opened and the like. The output of the sensors 22 is coupled on line 24 to a respective appliance interface controller (AIC) 26. The output of the appliance interface controller 26 is coupled to in-room controller (IRC) 30. The in-room controller 30 communicates with the appliance interface controller 26 through a small coaxial cable 28 distributed around the room. Power for both devices is also received through this coaxial cable 28 from a plug-in type power supply that can be inserted at any convenient point along the cable. See FIG. 4. The appliance interface controllers 26 are polled by the in-room controller 30 continuously so that when any change in the appliance occurs, new data will be made available as soon as possible to the system central processor 10. Each appliance 20 may serve a different function and therefore may require a different type of interface to meet the needs of the system. Communication from the in-room controller 30 to the appliance interface controller 26 is accomplished with a low frequency modem using amplitude shift keying.

The in-room controller 30 serves another function in addition to that of communicating with appliance interface controllers 26. It will also ask to talk to the central processor 10 when data has been received from one of the appliances located on its in-room network. It does this at random times blurting out its request whenever it has data to be transferred. If no acknowledgment from the central processor 10 occurs, the in-room controller 30 will wait a predetermined length of time and try again. When the central processor 10 does acknowledge, it tells all other in-room controllers in other rooms to hold off transmitting their requests. In addition, the central processor may consecutively poll each of the in-room controllers 30 and request a report on room conditions. When the communication between the designated in-room controller 30 is completed, an "all clear" is issued which allows other in-room controllers 30 to request use of the cable 16. Communications between the central processor 10 and the in-room controller 30 are through an RF modem. To modify existing systems, the in-room controller 30 is assigned a separate set of frequencies from the already existing converter polling frequencies. In new systems, the converter is incorporated into the in-room controller 30 to handle the cable TV systems and only one set of frequencies is required.

The serial interface line monitoring device 14 is utilized to pass the room data signal to the computer 12 and to check the quality of the transmission signal coming from each IRC 30 in each room 18. It does this by checking the signal level, frequency and frequency deviation as will be more fully explained hereafter. The serial interface line monitoring device 14 is actually a part of the central processor 10 and its room data output signal is coupled to a computer 12 in the central processor 10 where the data is stored in memory and is used for purposes such as billing through unit 32 on line 34, display of data on display 36 through line 38, and warning signals 40 on line 42. It also has a keyboard 44 through which data can be entered on line 46 into the computer memory and operational circuits.

For long distance interrogation of the computer memory, an external telephone modem 48 is coupled to telephone lines 50. The modem 48 has an output line 52 which is connected to an interface 54 thus allowing the telephone modem to communicate with the computer 12. Inasmuch as the memory bank and the computer 12 is storing not only the identifiable room data signals such as those representing the condition of each of the appliances, but also storing data representing the condition of the signal on cable 16 including the signal level, signal frequency, and frequency deviation, an individual at a remote location from central processor 10 would be able to access that data in computer 12 by telephone signals on line 50. That signal would be coupled through telephone modem 48 and line 52 to the interface 54. Interface 54 is part of computer 12 and thus the memory bank of the computer 12 can be interrogated from long distances thereby allowing one remotely located from the central processor 10 to gather information such as the status of each of the appliances in the rooms as well as the condition or quality of the transmission signals being generated by each of the in-room controllers 30.

Figure 2:
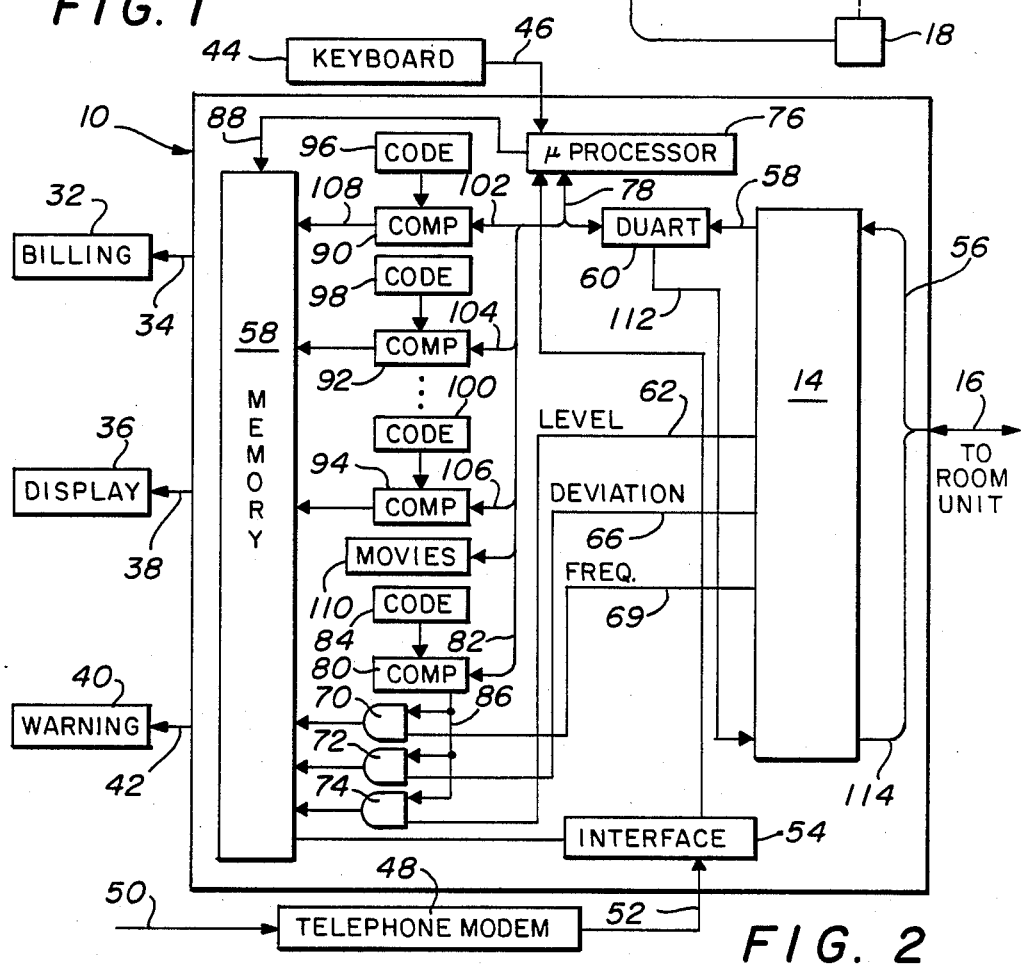
FIG. 2 is a schematic view of the details of the central processor.

FIG. 2 is a more detailed schematic view of the central processor 10 shown in FIG. 1. The signals to and from the in-room controller 30 in FIG. 1 are carried by cable 16. When the in-room controller 30 is transmitting signals on cable 16 to central processor 10, they are coupled on cable 56 as an input to the serial interface and line monitoring device 14. Device 14 not only passes the room data signals on line 57 to dual universal asynchronous receiver/transmitter (DUART) 60 but also checks the signal level, frequency and frequency deviation of each data transmission signal. The manner in which this will be accomplished will be shown in more detail in FIG. 3. Suffice it to say that the signal level, signal frequency and signal deviation data are converted to digital signals and transferred to memory 58. The signal level information is carried on line 62, the signal deviation information is carried by line 66 and the signal frequency information is carried by line 69. The signal on line 68 representing frequency is coupled to and gate 70, the signal on line 66 representing deviation is coupled to AND gate 72 and the signal on line 62 representing signal level information is coupled to AND gate 74.

Micro-processor 76 receives the room data signal from DUART 60 on line 78 and, since the signal contains an identifiable code representing the room unit 18 which is transmitting the signal, comparator 80 is caused by micro-processor 76 to compare the code on line 82 with the room codes represented by block 84. When the proper room code matches that of the coded signal, comparator 80 produces an output on line 86 which enables AND gates 70, 72 and 74 and allows the data representing the particular characteristics of that room signal to be stored in memory for future reference and for maintenance purposes. The microprocessor 76 is coupled to memory 58 through line 88 to select memory locations for storage of data therein. The incoming signal from the in-room controller 30 in a particular room unit 18 may carry information representing multiple conditions in the room. Thus other comparators 90, 92, and so on through 94 may also be receiving signals on input lines 102, 104 and 106 respectively and comparing these signals with stored codes represented by blocks 96, 98 and 100 respectively. Thus, code 96 may represent an in-room appliance such as a safe. If the safe has been opened, the appliance interface controller 26 would generate an identifiable signal as described earlier in relation to FIG. 1. That signal would be coupled to the in-room controller 30 which would recover it and then transmit the signal to the central processor 10. At that point, the signal on line 102 would be compared with code 96 by comparator 90 and if the code matches, the signals representing the opening of the safe would be coupled through line 108 to memory 58 for storage at a location indicated by the microprocesor signal on line 88.

In like manner code 98 could represent an identifiable signal indicating that products are being taken from a refrigerator while code 100 could represent an identifiable signal indicating an open door. Obviously, other appliances could be identified and monitored in the same fashion. All of the information received from the in-room controller 30 regarding the appliance interface controllers 26 which are connected to and monitoring the various appliances would be stored in memory 58 for future reference.

As explained earlier, keyboard 44 could enter signals into the micro-processor 76 externally through line 46 to give instructions as necessary. Further, billing could take place with device 32 by means of the signals from memory 58 on line 34. Also, display 36 could receive and selected signals from memory 58 on line 38 and display them. Finally, a warning device 40 could be activated by signals on line 42 from memory 58 under predetermined conditions such as when the signal frequency, deviation or level from any one of the in-room controllers 30 is out of specification.

DUART 60 also allows micro-processor 76 to communicate with the room units 18. For instance, movies, depicted by block 110, could be selected from each room 18 and the video signals applied through DUART 60 on line 112 which is also coupled to the serial interface and line monitoring device 14. The output of device 14 is coupled on line 114 to cable 16 which couples those signals back to the in-room controller 30.

Figure 3:
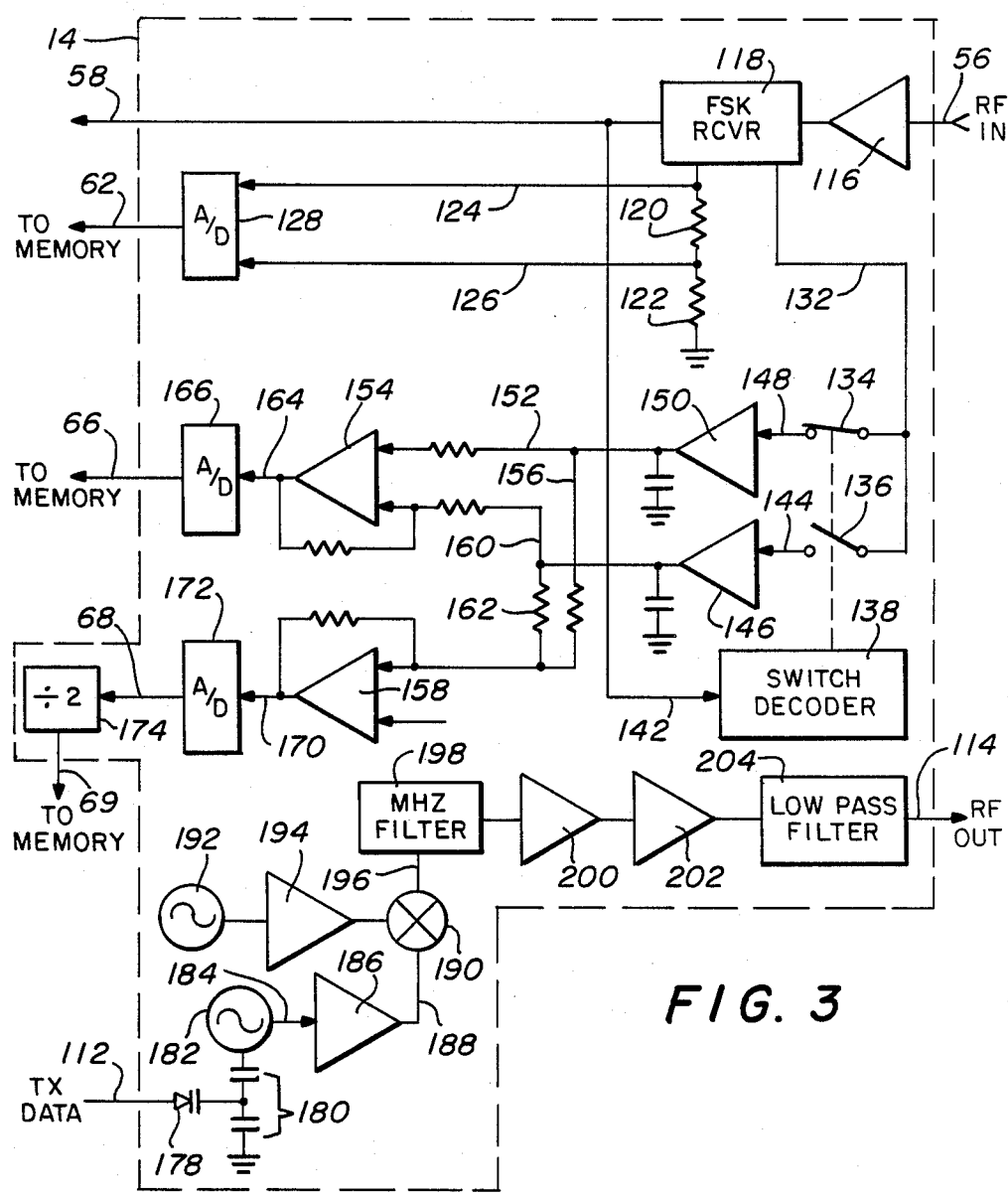
FIG. 3 is a schematic view of the details of the serial interface line monitoring device.

Referring now to FIG. 3, the details of the serial interface and line monitoring device 14 will be disclosed. The RF signals serially and individually received from in-room controllers 30 on line 56 are coupled through a low noise amplifier 116 to a frequency shift key receiver 118. The frequency shift key receiver removes the frequency shift key modulated signal from the RF carrier. The recovered signal is transferred on line 58 to the micro-processor 76. In addition, the frequency shift key receiver 118 develops a signal across resistors 120 and 122 to provide a signal to determine the level of the incoming signal. This accomplished by coupling leads 124 and 126 across resistor 120 with the values of the resistors adjusted such as to give a full-scale level reading on lines 124 and 126 when the signal level is properly adjusted. These signals are coupled to an analog-to-digital converter 128 which produces an output on line 62 that is coupled to the memory as shown in FIG. 2 previously.

Figure 5:
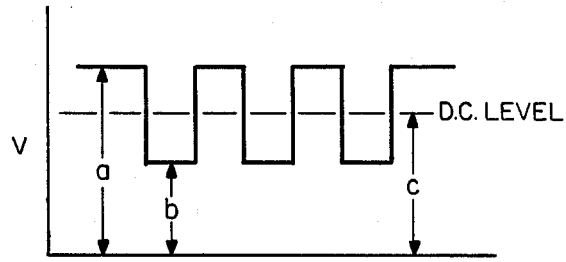
FIG. 5 is a graph of a monitor waveform.
Figure 6:
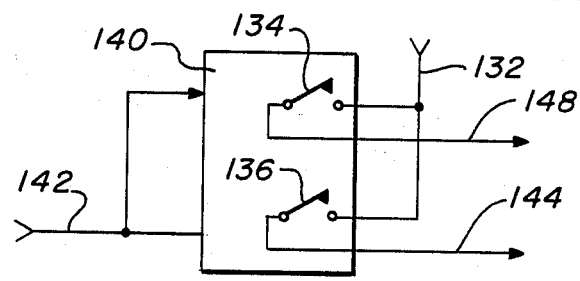
FIG. 6 is a diagram of an electronic switch.

The frequency shift key receiver 118 also generates a signal on line 132 which is coupled to switch 134 and switch 136. These switches are coupled in tandem and are operated by switch decoder 138. When one of the switches is closed, such as switch 134 as shown in FIG. 3, the other switch is open such as shown by switch 136 in FIG. 3. The signal on line 132 is an analogue signal shown in FIG. 5 having a minimum and maximum value about a DC level. Switch decoder 138 is shown in detail in FIG. 6 and comprises a bi-stable multivibrator 140 which has as a trigger input the output signal from FSK receiver 118 on line 58 (FIG. 3) and line 142. When the signal on line 142 gates decoder 138 at the point indicated by the letter "a" as shown in FIG. 5, switch 136 is closed in bi-stable multivibrator 140 (See FIG. 6) thereby allowing the digital signal level as shown in FIG. 5 on line 132 from FSK receiver 118 to be coupled through switch 136 and out on line 144 to the sample and hold circuit 146. In like manner, when the output from the FSK receiver 118 on line 142 gates decoder 138 at the point indicated by the letter "b" as shown in FIG. 5 the signal on line 142 will cause the bi-stable multi-vibrator 140 (FIG. 6) to change states thereby opening switch 136 and closing switch 134. When switch 134 is closed it couples the "b" level of the signal shown in FIG. 5 on line 132 through switch 134 and out on line 148 to sample and hold circuit 150 shown in FIG. 3. The amplitude or level of the signal received by the FSK receiver is determined by the current flowing through resistor 120 which is then connected to a digital signal by A/D converter 128.

Returning now to FIG. 3, it will be seen that the output of sample and hold circuit 150 is coupled on line 152 to differential amplifier 154 and is also coupled through line 156 to summing amplifier 158. In like manner, the output of the sample and hold circuit 146 is coupled on line 160 to differential amplifier 154 but is also coupled through resistor 162 to summing amplifier 158. It is well-known in the art that frequency deviation of a frequency shift keyed signal can be determined by subtracting the peak value "a" from the minimum value "b" shown in FIG. 5. Thus, $$a - b = \text{frequency deviation}$$

In like manner, $(a-b)/2$ will obtain a value equaling the DC level representing the frequency of the signal. Thus, $$(a+b)2 = \text{Frequency.}$$

It will be noted that differential amplifier 154 has both an "a" input on line 160 and a "b" input on line 152 thereby obtaining on the output 164 the value $(a-b)$. A to D converter 166 changes this signal to a digital signal and passes it on line 66 to memory 58 as described previously as in relation to FIG. 2.

In like manner, both signal "a" through resistor 162 and signal "b" on line 156 are summed and coupled to summing amplifier 158 thus producing on the output line 170 the sum $(a+b)$. Digital to analog converter 172 converts this signal into a digital value and then couples that value to a divide-by-2 circuit 174 which gives the desired result of $(a+b)/2$. This digital signal is coupled on line 69 to the computer memory as described in relation to FIG. 2.

Thus every incoming signal that is present on line 56 as an RF input from any in-room controller 30 has the signal parameters checked in relation to signal level, signal frequency and deviation. These incoming signals are individually received by the central processor since the central processor selects only one in-room unit 30 for communication at any one time. The value in this type of in-line monitor is that only one monitor needs to be used no matter how many rooms form a part of the system to which the monitor is connected, and consequently only one monitor is used. This is a significant improvement over the prior art methods and apparatus for detecting signal operating parameters.

As stated earlier, the output of the microprocessor 76 in FIG. 2 through the DUART 60 is coupled on line 112 to the serial interface line monitor 14 for transmission back to the in-room controller 30. As can be seen in FIG. 3, the digital signal on line 112 is coupled through varactor diode 178 to a capacitor network 180 to modulate the 18.0 MHz oscillator 182 by frequency shift keying as is well-known in the art. The modulated oscillator signal is coupled on line 184 to buffer amplifier 186. The output of the buffer amplifier 186 on line 188 is coupled to a mixer 190 where it is mixed with a signal from local oscillator 192 and buffer 194. Since the local oscillator frequency is 97.25 MHz and the modulated frequency shift key oscillator is 18 MHz the sum of the two signals from mixer 190 on line 196 is 115.25 MHz. This signal passes through filter 198, pre-amp 200 and post amp 202 to a low pass filter 204. The output of the low pass filter 204 on line 114 is the RF signal that is coupled back to the in-room controller 30 shown in FIG. 1 and carries movies and other information data for the room 18.

Thus it can be seen that the central processor 10 can receive signals from, as well as communicate information to, the in-room controller 30.

Figure 4:
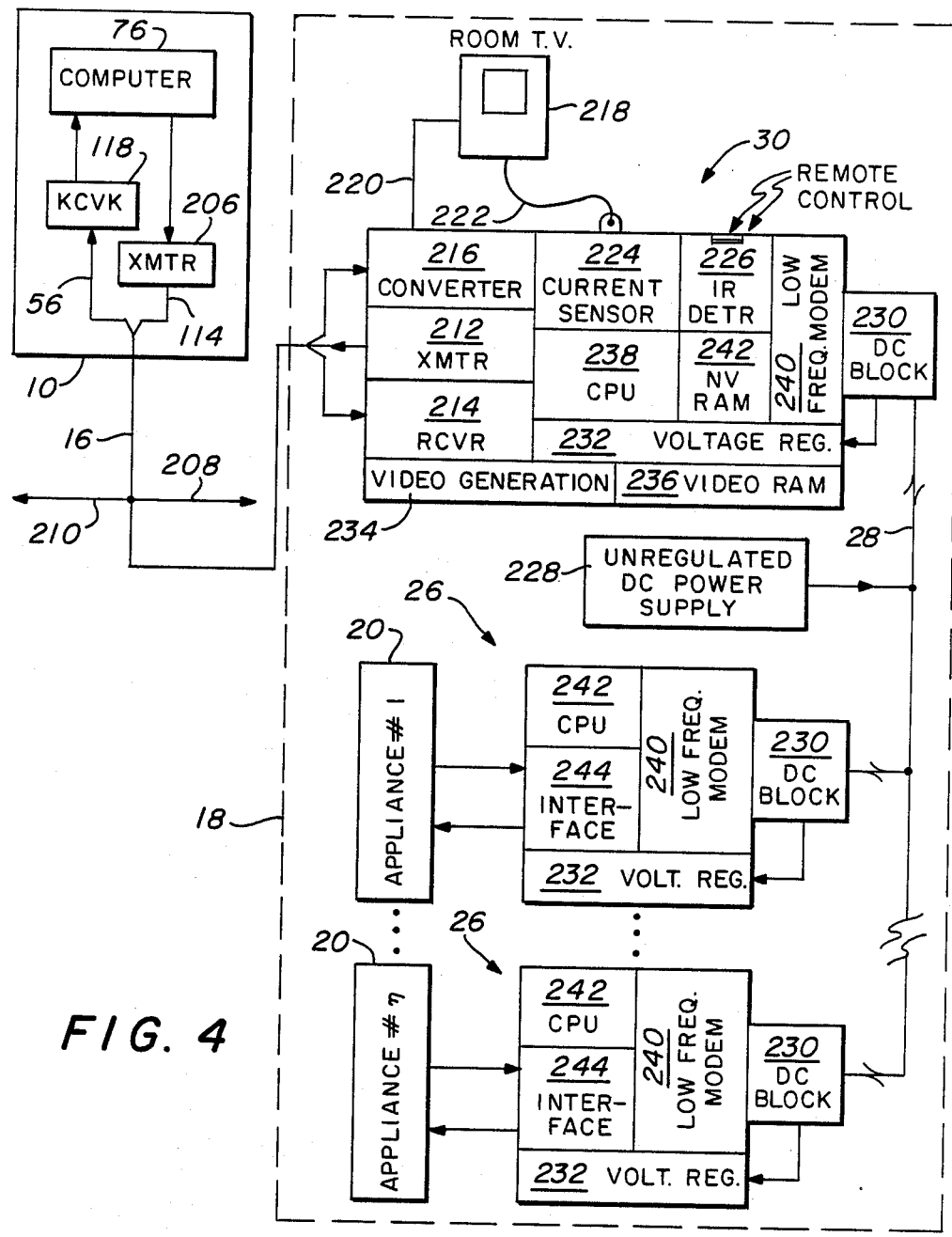
FIG. 4 is a schematic view of the system including the in-room controller and the appliance interface controllers in each room.

The details of the in-room controller 30 and the appliance interface controller 26 and the manner in which they interconnect with the central processor 10 is represented by the schematic in FIG. 4. As can be seen in FIG. 4 the central processor 10 includes, generally speaking, computer 76 and frequency shift key input receiver 118 and the output transmitter 206. The input signals are at 13 MHz and output signals are at 115.25 MHz to and from these receivers and transmitters and are carried by cable 16 to room unit 18. Obviously, the signals also go to other room units as indicated by arrows 208 and 210. Since they all operate in an identical fashion, only the room unit 18 shown in FIG. 4 will be disclosed in detail.

As indicated earlier the in-room controller 30 serves two function. It will ask to talk with the central processor 10 when data has been received from one of the appliances 20 located in the room and coupled through the appliance interface controller 26. It may do this at random times blurting out its request whenever it has date to be transferred. If no acknowledgment from the computer 76 occurs, the in-room controller 30 will wait a predetermined length of time and try again. When the central processor 10 does acknowledge, it tells all of the other in-room controllers to hold off transmitting their request. When the communication with the in-room controller 30 is completed, the central processor 10 issues an all clear signal on cable 16 and the other in-room controllers may communicate with the computer 10. Communication from the in-room controller 30 is through an RF modem including transmitter 212 in in-room controller 30 and receiver 118 in central processor 10. In the other direction communication takes place through transmitter 206 in central processor 10 and receiver 214 in in-room controller 30. In an existing system, the present modification could be added simply by assigning the in-room controller 30 a separate set of frequencies from the already existing polling frequencies. A description of the system in FIG. 4 envisions a new system utilizing only the use of frequences of 13 MHz and 115.25 MHz. Converter 216 in in-room controller 30 converts all received television signals to a single channel output so that normal pictures can be observed on the room television set 218. Normal cable TV signals are coupled directly to the room TV 218 through cable 220. The television set 218 is plugged into and receives its power from in-room controller 30 on cable 222 so that current sensor 224 can detect when the television set is turned on. That information is available to be transmitted back to the central processor 10. In addition, when the remote control unit is utilized the IR detector 226 intercepts the remote control unit signal and turns the room TV set on so that local control of the TV set can be utilized.

The in-room controller 30 is coupled to the appliance interface controller 26 through a cable 28. Cable 28 is a small coaxial cable distributed around the room 18 with power for both the in-room controller 30 and appliance interface controller 26 being received through this coax from a plug-in type power supply 228 that can be inserted at any convenient point along cable 28. A DC block 230 is utilized in each in-room controller 30 and each appliance interface controller 26 to prevent the DC voltage from interfering with the AC circuits. This block could be a simple capacitor. Both the in-room controller 30 and the appliance interface controller 26 have a voltage regulator 232 therein for providing the proper operating voltage. The in-room controller 30 has a video generation circuit 234 which in conjunction with the video random access memory 236 form a video generator. This video generator can perform functions such as graphic generations for games, messages, teletexts, or channel and time on-screen functions. In addition, the central processing unit 238 in the in-room controller 30 controls the communication between the in-room controller 30 and the central processor 10 as well as the communication between the in-room controller 30 and appliance interface controllers 26. The central processing unit 238 continuously polls the AIC's and transmits and receives signals on line 28 to and from each appliance interface controller 26 through a low frequency modem 240 located in both the in-room controller 30 and each appliance interface controller 26. While the low frequency modem is the preferred use herein, other type of signal transmission could be used. If on one poll no response is received from an AIC, the IRC flags that AIC as possibly being inoperative, If no response is received on the second poll, the unit is flagged as inoperative and the information is transmitted to the central processor The non-volatile RAM 241 in the in-room controller 30 stores the room ID and the appliance ID for transmission to the central processor 10.

Each appliance interface controller 26 contains a central processing unit 242 and an interface 244 which couples the central processing unit 242 to the appliance. The appliance interface controller central processing unit 242 continuously polls the appliance 20 through interface 244 and when any change is detected, it provides an output through low frequency modem 240 which can be detected by the in-room controller 30 when it polls the appliance interface controller 26. Thus when any change in any appliance occurs, new data will be made available to the central processor 10. The communication between the in-room controller 30 and the appliance interface controller 26 is accomplished with the low frequency modems 240 using amplitude shift keying (ASK). This prevents any interference with the communication between the in-room controller 30 and the central processor 10 which is accomplished by frequency shift keying (FSK). As stated earlier, other methods of signal transmission could be used.

Thus the present invention as disclosed has several important features which improve over the prior art. First, a single monitoring device is included in the central processor through which signals from each in-room controller must pass thereby enabling the operating parameters of the signal from each room to be monitored and stored in the central processor. This eliminates the need for multiple monitoring devices scattered throughout the communications system at various points as is done in the prior art.

In addition, the use of the telephone modem coupled to the memory in the central processor allows all of the information stored in the processor regarding the rooms (content as well as the condition of the signal from each room to the central processor) to be monitored from a remote distance by a single operator who can then utilize statistical data or notify maintenance workers in that area to take care of any problems. This reduces costs considerably by eliminating the need to have personnel stationed at all times at each of the hotels/motels where the systems are in operation.

Finally, a separate polling operation takes place in each room between the in-room controller and the appliance interface controllers by amplitude shift key modulation of a low frequency signal to constantly monitor the status of in-room appliances to detect any change and report that change immediately to the central processor where the change is recorded in the computer.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

I claim:

1. A communication system for use in a coaxial cable data transmission system between a central processor and a remote terminal located in each of a plurality of remote locations comprising:
   a. means in each of said remote terminals for generating an identifiable data transmission signal,
   b. means in said central processor coupled to each of said remote terminals by a communication line for separately and individually receiving said identifiable data transmission signals,
   c. a single signal moitoring device in said central processor coupled to said communication line for individually measuring selected parameter data representing the signal level, signal frequency and signal frequency deviation of each of said identifiable transmission signals, and
   d. storage means in said central processor coupled to said monitoring device for recoverably storing each of said selected measured signal parameters so that the stored data representing the signal level, signal frequency and signal frequency deviation of each transmitted identifiable signal may be accessed for maintenance purposes.

2. A communication system for use in a coaxial cable data transmission system between a central processor and a remote terminal in each of a plurality of remote locations comprising:
   a. computer means in said central processor for consecutively polling each of said remote terminals over a communication line,
   b. means in each of said remote terminals for generating an identifiable response signal on said communication line when polled,
   c. means in said central processor for consecutively receiving said identifiable response signals from each of said consecutively polled remote terminals on said communication line,
   d. a single signal monitoring device in said central processor coupled to said communication line for individually measuring selected parameter data representing the signal level, signal frequency and signal frequency deviation of each of said identifiable transmission signals, and
   e. storage means in said central processor coupled to said measuring means for recoverably storing each of said selected measured signal parameters so that the stored data representing the signal level, signal frequency and signal frequency deviation of each transmitted identifiable signal may be accessed for maintenance purposes.

3. A communication system for use in a coaxial cable distribution system comprising:
   a. a remote terminal in each of a plurality of remote locations,
   b. means in each remote terminal for generating identifiable data transmission signals representing a remote location condition,
   c. a central processor having a communication line coupled to each of said remote terminals for polling each of said terminals and receiving said identifiable transmission signal in response thereto,
   d. first storage means in said central processor for recoverably storing said identifiable data representing said remote location condition so that said stored data may be accessed for statistical purposes,
   e. a single signal monitoring device in said central processor coupled to said communication line for measuring selected parameter data representing the signal level, signal frequency and signal frequency deviation of each of said identifiable transmission signals, and
   f. second storage means in said central processor coupled to said monitoring device for recoverably storing each of said selected measured signal parameters so that the stored data representing the signal level, signal frequency and signal frequency deviation of each transmission signal may be accessed for maintenance purposes.

4. A device as in claim 3 wherein said single monitoring device comprises;
   a. an FSK receiver for producing an analogue output signal to said central processor representing each of said identifiable response signals,
   b. first means coupled to said FSK receiver for generating a first analogue signal representing said response signal level,
   c. second means coupled to said FSK receiver for generating a second analogue signal representing said response signal frequency, and
   d. third means coupled to said FSK receiver for generating a third analogue signal representing said response signal deviation.

5. A device as in claim 4 further comprising;
   a. means for converting each of said first, second and third analogue signal to a corresponding first, second and third digital signals, and
   b. means in said central processor coupled to said converting means for accessibly storing said corresponding digital signals representing said measured parameters of each said response signal.

6. A method of communication for use in a coaxial cable data distribution system comprising the steps of:
   a. generating an identifiable data transmission signal with a remote terminal in each of said remote locations to represent a remote location condition,
   b. coupling a central processor having a communication line to each of said remote terminals for receiving said identifiable transmission signal,
   c. recoverably storing said identifiable data signal representing said remote location condition in first storage means in said central processor so that said stored data signal may be accessed for statistical purpose,
   d. coupling a single signal monitoring device in said central processor to said communication line for measuring selected parameter data representing the signal level, signal frequency and signal frequency deviation of each of said identifiable transmission signals, and
   e. coupling said signal monitoring device to a second storage means in said central processor for recoverably storing each of said selected measured signal parameters so that the stored data representing the signal level, signal frequency and signal frequency deviation of each transmitted signal may be accessed for maintenance.

7. A method as in claim 6 further comprising the steps of:
   a. producing an FSK analogue output signal to represent each of said identifiable response signals,
   b. coupling first means to said FSK receiver for generating a first analogue signal representing said response signal level,
   c. coupling second means to said FSK receiver for generating a second analogue signal representing said response signal frequency, and
   d. coupling third means to said FSK receiver for generating a third analogue signal representing said signal deviation.

8. A method as in claim 7 further comprising the steps of:
   a. converting said first, second and third analogue signals to corresponding first, second and third digital signals, and
   b. accessibly storing said corresponding digital signals representing said measured parameters of each of said response signals in said central processor.

9. A method of communicating in a coaxial cable data transmission system between a central processor and a remote terminal located in each of a plurality of remote locations comprising the steps of:
   a. generating an identifiable data transmission signal by each of said remote terminals,
   b. separately and individually receiving said identifiable data transmission signals in said central processor,
   c. individually measuring selected parameter data representing the signal level, signal frequency and signal frequency deviation of each of said identifiable transmission signals with a single monitoring device in said central processor, and
   d. recoverably storing each of said selected measured signal parameters so that the stored data representing the signal level, signal frequency and signal frequency deviation of each transmitted identifiable signal may be accessed for maintenance purposes.

10. A method of communication for use in a coaxial cable data transmission system between a central processor and a remote terminal in each of a plurality of remote locations comprising the steps of:
    a. consecutively polling each of said remote terminals over a communication line with a computer means in said central processor,
    b. generating an identifiable response signal by each of said remote terminals on said communication line when polled,
    c. consecutively receiving said identifiable response signals from each of said consecutively polled remote terminals on said communication line by said central processor,
    d. individually measuring selected parameter data representing the signal level, signal frequency and signal frequency deviation of each of said identifiable transmission signals with a single monitoring device in said central processor, and
    e. recoverably storing each of said selected measured signal parameters in storage means in said central processor so that the stored data representing the signal level, signal frequency and signal frequency deviation of each transmitted identifiable signal may be accessed for maintenance purposes.

11. A device as in claim 3 further comprising:
    a. an interface in said central processor,
    b. a telephone modem external of said central processor and coupled to said interface for enabling telephone communications with said central processor, and
    c. a control center remote from said central processor and coupled to said modem by telephone lines for generating interrogation signals to said central processor to access said second storage means and recover data representing the quality of each said transmitted signal so that said selected response signals may be reviewed remotely for maintenance purposes.

12. A device as in claim 11 further including:
    a. means in said central processor for accessing selected response signal parameters in said second storage means in response to said interrogation signals from said control center, and
    b. means in said central processor for coupling said selected signal parameters to said interface for transmission by telephone lines to said remote control center.

13. A method as claim 6 further comprising the steps of:
    a. coupling a telephone modem external of said central processor to an interface in said central processor for enabling telephone communications with said central processor, and
    b. generating interrogation signals to said central processor through said modem by telephone lines from said control center remote from said central processor to access said second storage means and recover data representing the quality of each of said transmitted signals so that the quality of each of said selected response signals may be reviewed remotely for maintenance.

14. A method as in claim 13 further comprising the steps of:
   a. accessing selected response signal parameters in said second storage means in said central processor in response to said interrogation signals from said control center, and
   b. coupling said selected signal parameters to said interface in said central processor for transmission by telephone lines to said remote control center.

15. A device as in claim 3 wherein said means in each of said remote terminals for generating an identifiable data transmission signal representing a remote location condition comprises:
   a. an in-room controller in a hotel/motel room,
   b. a plurality of appliances in said room,
   c. at least one sensor in each appliance for generating an identifiable signal representing a condition of said appliance,
   d. an appliance interface controller coupled to each appliance for receiving said condition representing signal,
   e. means in said appliance interface controller for modulating a signal with said condition representing signal for transmission to said in-room controller,
   f. signal means in said in-room controller for continuously polling said appliance interface controllers and receiving said modulated signal in response to said polling signal and recovering said condition representing signal, and
   g. means in said in-room controller for modulating a high frequency signal with said condition representing signal and a coded signal identifying said room for transmission to said central processor.

16. A device as in claim 15 further comprising:
   a. signal generating means in said appliance interface controller for polling each room appliance on a periodic basis to obtain an identifiable data signal representing a condition of said appliance, and
   b. means in said appliance interface controller for storing said identifiable data signal received from said sensor representing said appliance condition and transmitting said stored identifiable data signal to said in-room controller in response to said in-room controller polling signal.

17. A device as in claim 16 further comprising means in said appliance interface controller for utilizing said identifiable data signal to amplitude shift key modulate a low frequency signal for transmission to said in-room controller.

18. A device as in claim 17 further comprising:
   a. means in said in-room controller for recovering said identifiable data signal from said low frequency signal, and
   b. a data storage device in said in-room controller for storing said recovered identifiable data signal representing said appliance condition.

19. A system for long distance computer interrogation of hotel/motel operations comprising:
   a. a central processor in said hotel/motel for receiving and storing signals representing room conditions from each room over a coaxial communication cable,
   b. means in said central processor coupled to said communications cable for generating and storing signals representing the transmission quality of each of said received room signals,
   c. an interface in said central processor,
   d. a telephone modem external of said central processor and coupled to said interface for enabling telephone communication with said central processor,
   e. a computerized control center located at a remote distance from said central processor and coupled to said modem by telephone line, and
   f. means in said control center for generating interrogation signals to said central processor over said telephone lines to access said stored signals representing said room conditions and said room signal transmission quality for review at said computerized control center.

20. A method of long distance computer interrogation of hotel/motel operations comprising the steps of:
   a. receiving signals representing room conditions from each room in said hotel/motel over a coaxial cable and storing said received signals in a central processor,
   b. generating and storing signals in said central processor which represent the transmission quality of each of said received room signals,
   c. coupling a telephone modem external of said central processor to an interface in said central processor for enabling telephone communication with said central processor,
   d. locating a computerized control center at a remote distance from said central processor,
   e. coupling said computerized control center to said modem by telephone lines for communication with said central processor, and
   f. generating interrogation signals to said central processor from said control center over said telephone lines to access said stored signals representing said room conditions and said room signal transmission quality for review at said computerized control center.

21. An in-room polling link for hotel/motel operations having a central processor for communicating with each room over a signal line comprising:
   a. an in-room controller in each of said rooms,
   b. a plurality of appliances in each of said rooms,
   c. at least one sensor in each appliance for generating an identifiable data signal representing a condition of said appliance,
   d. an appliance interface controller coupled to each appliance for receiving said appliance condition representing signal,
   e. means in said appliance interface controller for modulating a low frequency signal with said condition representing signal for transmission to said in-room controller,
   f. signal means in said in-room controller for continuously polling said appliance interface controllers and receiving said modulated low frequency signal in response to said polling signal and recovering said condition representing signal,
   g. means in said in-room controller for generating a code signal identifying said room, and
   h. means in said in-room controller for modulating a high frequency signal with said recovered appliance condition representing signal and said room identifying code signal for transmission to said central processor.

22. An in-room link as in claim 21 further comprising:

a. means in said appliance interface controller for amplitude shift key modulation of said low frequency signal with said appliance condition signal for transmission to said in-room controller, and b. means in said in-room controller for frequency shift key modulation of said high frequency signal with said recovered appliance condition signal and said room identifying code signal for transmission to said central processor.

23. A method for in-room polling for hotel/motel operations having a central processor for communicating with each room over a signal line comprising the steps of:

a. a sensor coupled to at least one appliance in each of said rooms for generating an identifiable data signal representing a condition of said appliance, b. coupling an appliance interface controller to each appliance for receiving said appliance condition representing signal, c. modulating a low frequency signal with said condition representing signal in said appliance interface controller for transmission, d. continuously polling each appliance interface controller with an in-room controller, e. receiving said modulated low frequency signal in said in-room controller in response to said polling signal and recovering said condition representing signal, f. generating a code signal in said in-room controller for identifying said room , and g. modulating a high frequency signal in said in room controller with said recovered appliance condition representing signal and said room identifying code signal for transmission to said central processor.

24. A method as in claim 23 further comprising the steps of:

a. amplitude shift key modulating said low frequency signal in said appliance interface controller with said appliance condition signal for transmission to said in-room controller, and b. frequency shift key modulating said high frequency signal in said in-room controller with said recovered appliance condition signal and said room identifying code signal for transmission to said central processor.

25. A communications system for use in a hotel/motel between a central processor and each of a plurality of rooms and each of said rooms and appliances within said room comprising:

a. an in-room controller in each room for communicating with central processor and said appliances, b. means in said central processor and said in-room controller for frequency shift key modulation of a high frequency signal with intelligence data for communicating between said room and said central processor, c. an appliance interface controller coupled to each appliance for receiving said communications from said in-room controller and communicating with said appliances, and d. means in said in-room controller and said appliance interface controller for amplitude shift key modulation of a low frequency signal for communication between said appliance interface controller and said in-room controller.

26. A communications system as in claim 25 further comprising:

a. a coaxial cable coupling said in-room controller with said appliance interface controller for carrying said communications, and b. a plug-in type AC power supply coupled to said cable for carrying power for said in-room controller and said appliance interface controller.

27. A method of communication for use in hotel/motel between a central processor and each of a plurality of rooms and each of said rooms and at least one appliance within said room comprising:

a. communicating with both said central processor and said appliances with an in-room controller in each room, b. frequency shift key modulating a high frequency signal in both said central processor and said in-room controller with intelligence data for communicating between said room and said central processor, c. coupling an appliance interface controller to each appliance for receiving said communications from said in-room controller and communicating with said appliance, and d. amplitude shift key modulating a low frequency signal in said in-room controller and said appliance interface controller for communication between said appliance interface controller and said in-room controller.

28. A method as in claim 27 further comprising the steps of:

a. coupling said in-room controller to said appliance interface controller with a coaxial cable for carrying said communications, and b. coupling a plug-in type AC power supply to said cable for carrying power for said in-room controller and said appliance interface controller.

* * * * *